(12) United States Patent
Xiong et al.

(10) Patent No.: US 11,664,509 B2
(45) Date of Patent: May 30, 2023

(54) HIGH-EFFICIENCY HEAT EXCHANGER FOR TEMPERATURE CONTROL SYSTEM OF FUEL CELL AND PROCESSING DEVICE THEREOF

(71) Applicant: Zhejiang University, Zhejiang (CN)

(72) Inventors: Shusheng Xiong, Zhejiang (CN); Yonggen Zhang, Zhejiang (CN); Defeng Xuan, Zhejiang (CN); Wei Li, Zhejiang (CN); Qiujie Song, Zhejiang (CN); Zhaohan Hu, Zhejiang (CN)

(73) Assignee: Zhejiang University, Hangzhou (CN)

( * ) Notice: Subject to any disclaimer, the term of this patent is extended or adjusted under 35 U.S.C. 154(b) by 159 days.

(21) Appl. No.: 17/216,276

(22) Filed: Mar. 29, 2021

(65) Prior Publication Data

US 2021/0218040 A1    Jul. 15, 2021

(30) Foreign Application Priority Data

Apr. 3, 2020 (CN) .......................... 202010257574.2

(51) Int. Cl.
| | |
|---|---|
| *H01M 8/04044* | (2016.01) |
| *H01M 8/04701* | (2016.01) |
| *H01M 8/04746* | (2016.01) |
| *F28D 7/02* | (2006.01) |
| *F28G 9/00* | (2006.01) |

(52) U.S. Cl.
CPC .......... *H01M 8/04044* (2013.01); *F28D 7/02* (2013.01); *F28G 9/00* (2013.01); *H01M 8/04708* (2013.01); *H01M 8/04753* (2013.01); *H01M 2250/20* (2013.01)

(58) Field of Classification Search
CPC . H01M 8/04044; H01M 8/04074; F28D 7/02; F28G 9/00
See application file for complete search history.

(56) References Cited

U.S. PATENT DOCUMENTS

| | | | | |
|---|---|---|---|---|
| 2011/0290235 | A1* | 12/2011 | NewDelman | ........... F24S 20/61 126/646 |
| 2012/0090816 | A1* | 4/2012 | Bayazitoglu | ............ F28F 21/02 219/121.72 |
| 2012/0195004 | A1* | 8/2012 | Miller | ................. H01L 23/3737 361/705 |
| 2012/0272643 | A1* | 11/2012 | Sherlock | ................. F02G 1/057 165/10 |
| 2013/0071717 | A1* | 3/2013 | Muniz | ................. H01M 10/613 429/120 |

(Continued)

*Primary Examiner* — Ula C Ruddock
*Assistant Examiner* — Scott J Chmielecki (57) ABSTRACT

The disclosure provides a high-efficiency heat exchanger for a temperature control system of a fuel cell and a processing device thereof. The processing device includes a frame body and a power box. A bottom of the frame body is fixed to the ground by screws, and the power box is arranged at a side of the frame body for intelligent control. A displacement screw is arranged on a top of the frame body, and a sliding block driven by electricity is arranged on a surface of the displacement screw. Two ends of the displacement screw are respectively provided with a limit switch for controlling a limit position of the sliding block. A drive motor is arranged on a surface of the sliding block, and a displacement sensor is arranged on one side surface of the sliding block.

7 Claims, 4 Drawing Sheets

(56) References Cited

U.S. PATENT DOCUMENTS

| | | | | |
|---|---|---|---|---|
| 2013/0291368 | A1* | 11/2013 | Davidson | H05K 7/20809 439/485 |
| 2015/0040909 | A1* | 2/2015 | Willard | A61M 16/0633 128/205.25 |
| 2015/0159967 | A1* | 6/2015 | Furumura | F28F 3/08 165/76 |
| 2015/0165871 | A1* | 6/2015 | Miller | B60H 1/2209 237/28 |
| 2015/0208551 | A1* | 7/2015 | Davidson | H05K 7/20781 165/80.2 |
| 2015/0267966 | A1* | 9/2015 | Lin | F28D 7/0016 29/890.03 |
| 2015/0319881 | A1* | 11/2015 | Kusuda | H05K 7/20509 174/547 |
| 2015/0368535 | A1* | 12/2015 | Dardona | H01L 23/3736 428/408 |
| 2016/0079639 | A1* | 3/2016 | Pinon | H01M 10/6556 429/120 |
| 2016/0226111 | A1* | 8/2016 | Blume | H01M 10/6572 |
| 2016/0320149 | A1* | 11/2016 | Poltorak | F28F 13/12 |
| 2017/0097197 | A1* | 4/2017 | Poltorak | F28F 1/40 |
| 2017/0115073 | A1* | 4/2017 | Knox | F28F 21/084 |
| 2017/0202114 | A1* | 7/2017 | Davidson | H05K 7/20809 |
| 2017/0245394 | A1* | 8/2017 | Matte | F28F 3/06 |
| 2017/0325287 | A1* | 11/2017 | Ji | H05B 1/0236 |
| 2018/0017345 | A1* | 1/2018 | Poltorak | H05K 1/0203 |
| 2018/0087218 | A1* | 3/2018 | Sorrentino | B05D 3/007 |
| 2018/0177072 | A1* | 6/2018 | Pando Rodriguez | H01L 23/467 |
| 2018/0212289 | A1* | 7/2018 | Pinon | H01M 10/647 |
| 2018/0219191 | A1* | 8/2018 | Drews | H01M 50/557 |
| 2018/0248238 | A1* | 8/2018 | Pinon | H01M 10/613 |
| 2018/0261522 | A1* | 9/2018 | Brunschwiler | H01L 21/4882 |
| 2019/0100079 | A1* | 4/2019 | Lee | F28F 1/426 |
| 2019/0116693 | A1* | 4/2019 | Dror | H05K 7/20836 |
| 2019/0353314 | A1* | 11/2019 | Park | H05B 47/19 |
| 2019/0369684 | A1* | 12/2019 | Davidson | F28F 9/26 |
| 2020/0033014 | A1* | 1/2020 | Ballegeer | F24T 10/17 |
| 2020/0049415 | A1* | 2/2020 | Schiffres | F28D 15/046 |
| 2020/0148894 | A1* | 5/2020 | Folsom | B05D 1/18 |
| 2021/0242811 | A1* | 8/2021 | Carver | H02N 11/008 |
| 2021/0403326 | A1* | 12/2021 | Nosker | H01M 10/052 |
| 2022/0084693 | A1* | 3/2022 | Dodaro | G21B 3/008 |
| 2022/0120517 | A1* | 4/2022 | Poltorak | H01L 23/367 |
| 2022/0146153 | A1* | 5/2022 | Hadash | A61J 1/165 |

\* cited by examiner

HIGH-EFFICIENCY HEAT EXCHANGER FOR TEMPERATURE CONTROL SYSTEM OF FUEL CELL AND PROCESSING DEVICE THEREOF

CROSS-REFERENCE TO RELATED APPLICATIONS

This application claims the benefit of priority from Chinese Patent Application No. 202010257574.2, filed on Apr. 3, 2020. The content of the aforementioned application, including any intervening amendments thereto, is incorporated herein by reference in its entirety.

TECHNICAL FIELD

The present application relates to fuel cells, and more particularly to a high-efficiency heat exchanger for a temperature control system of a fuel cell and a processing device thereof.

BACKGROUND

In the latest national standards in China, automobiles refer to non-track-carrying vehicles driven by power and having four or more wheels, which are mainly adopted to the transportation of people or goods. The automobiles have experienced a long development process. As early as 1680, the famous British scientist Newton envisioned a jet car plan, which adopts nozzles to inject steam to propel the car, but this idea has not been embodied in the practical application. Until 1769, the Frenchman N. J. Cugnot produced a three-wheeled automobile which was driven by steam generated from the gas burning, but the velocity of the automobile was only 4 km/h, and it had to stop for coal feeding every fifteen minutes, leading to troublesome operations. In 1879, Germany Engineer Carl Benz successfully invented a two-stroke experimental engine for the first time. In October of 1883, he founded the "Benz Company and Rhein Gas Engine Factory". In 1885, he made the first patented motor vehicle of Bentz in Mannheim, where the vehicle was a three-wheeled vehicle using a two-stroke single-cylinder 0.9 horsepower gasoline engine, and contained some basic features of modern vehicles, such as spark ignition, cooling cycle, steel frame, rear-wheel drive, front wheel steering and brake handles. In 1885, gasoline engines were manufactured, which brought a great improvement in the driving velocity of the vehicle.

In modern society, automobiles have become a common means of transportation. However, with the increase in the use of automobiles, the emission of exhaust has caused serious environmental pollution. Therefore, people have begun to develop environmentally friendly automobiles, and the fuel vehicles of new energy vehicles have come into being. Fuel vehicles are a kind of vehicle that uses the electricity generated by the on-board fuel cell device as the motive power, where the fuel used in the on-board fuel cell device is high-purity hydrogen or high-hydrogen reformed gas obtained by reforming hydrogen-containing fuel. Fuel cell vehicles are a kind of battery vehicles. Different from common chemical batteries, the fuel cells can be replenished with fuel when required. Compared to pure electric vehicles, the batteries can be filled with fuel in a short time without waiting for a long charging test. Therefore, fuel cell vehicles have become a more popular type of vehicle on the market today. When fuel cells are used, heat exchangers need to be exchanged to achieve temperature control in the vehicle. Therefore, the temperature control effect greatly depends on the overall quality of the heat exchanger. In the treatment process, the surface of the heat exchanger needs to be cleaned integrally to avoid the appearance of dirt and affect the work efficiency. In the prior art, the heat exchangers are cleaned manually, leading to large labor consumption. Moreover, the cleaning effect and efficiency are generally unsatisfactory, which will cause a waste of resources.

SUMMARY

An object of the present disclosure is to provide a high-efficiency heat exchanger for a temperature control system of a fuel cell and a processing device thereof, to achieve an efficient cleaning without a large consumption of human labor. In the processing device, a connection structure is provided to improve the overall cleaning process, thereby bringing a stable cleaning effect. In addition, the processing device can avoid waste of resources and improve the cleaning efficiency.

To achieve the above object, the technical solutions of the present disclosure are described as follows.

The present disclosure provides a heat exchanger for a temperature control system of a fuel cell, comprising:

a casing; and a spiral flow channel;

wherein the spiral flow channel is arranged inside the casing; an exchange flow channel is spirally formed at an inner side of the spiral flow channel through an isolation column; a cold inlet and a cold outlet are respectively provided at both ends of the spiral flow channel; a hot inlet and a hot outlet are respectively provided at both ends of the exchange flow channel; the cold inlet and the hot outlet are arranged at a surface of a side cover and penetrate the side cover, respectively; the side cover is welded to one end of the casing; the cold outlet and the hot inlet are respectively inserted into a bottom surface of the casing; a closing plate is welded to the other end of the casing; an inside of the isolation column is filled with a heat exchange structure; and a cover is welded on a surface of one end of the isolation column provided with the heat exchange structure.

In some embodiments, the isolation column is made of aluminum alloy, and the isolation column has a column-shaped middle and gentle tapers at both ends; the isolation column is uniformly welded on a surface of the spiral flow channel and a surface of exchange flow channel, respectively; the isolation column is configured to isolate the spiral flow channel and the exchange flow channel to realize heat transfer and heat exchange; the heat exchange structure is made of graphene; the heat exchange structure is completely filled in a cavity of the isolation column; and an outer wall of the heat exchange structure and the isolation column are integrally attached.

The present disclosure further provides a processing device for a heat exchanger for a temperature control system of a fuel cell, comprising:

a frame body, a bottom of which is fixed to ground by screws; and a power box, arranged at a side of the frame body for intelligent control;

wherein a displacement screw is arranged on a top of the frame body; a sliding block driven by electricity is arranged on a surface of the displacement screw; two ends of the displacement screw are respectively provided with a limit switch for controlling a limit position of the sliding block; a drive motor is arranged on a surface of the sliding block; a displacement sensor is arranged on a surface of one side of the sliding block; a hydraulic rod is arranged inside the drive motor and driven by the drive motor; a base support is adsorbed at a bottom end of the hydraulic rod; a cleaning box is arranged under the base support; a base platform is arranged at a bottom end of the cleaning box; a drain pipe is arranged inside the base platform; a motor is arranged inside the base platform; a shaft end of the motor is penetratingly arranged at a bottom end of the cleaning box; an outer periphery of a rotating shaft of the motor is sealed by a sealing ring; a top of the rotating shaft is penetratingly arranged at a bottom end of a rotating plate; at least one center column is arranged on a surface of the rotating shaft; a periphery of each of the at least one center column is sleeved with a cleaning structure; a programmable logic controller (PLC) is arranged inside the power box; a button switch is arranged on a surface of the power box for controlling on-off of a circuit; at least one buckle arc is provided on a surface of the base support by snap fixing; an object sensor is embedded at the surface of the base support on one side of the at least one buckle arc; an electromagnet is arranged on the surface of the base support; a distance sensor is arranged on a bottom of the base support; a plurality of micro-openings are distributed on a surface of the cleaning structure; and a cleaning arc is adhered to the surface of the cleaning structure.

In some embodiments, the frame body has a rectangular structure made of aluminum alloy; a connecting line between a center of the frame body and a center of the cleaning box is perpendicular to ground; a linear distance of the frame body is equal to a length of the displacement screw; an input terminal of each of the at least one PLC is connected to a switch, the limit switch, the distance sensor, an object sensor, a timer, and the displacement sensor through wires; a power port of each of the at least one PLC is connected to an external control power supply through a voltage regulator module; and an output terminal of the PLC is connected to the drive motor, the electromagnet, the displacement screw and the motor through a first drive module, a second drive module, a third drive module and a fourth drive module, respectively.

In some embodiments, a surface of the displacement screw is divided into three working points by the limit switch and the displacement sensor mounted on a surface of the sliding block; the hydraulic rod is driven by the PLC to perform corresponding actions to realize intelligent transmission at positions corresponding to the three working points; a distance between the displacement screw and the ground is equal to a linear length of the hydraulic rod in a fully-extended state; the limit switch is a mx135 type micro switch; the limit switch is intelligently controlled by the PLC; a working mode of the limit switch is light touch determination; the drive motor drives the hydraulic rod to form an electric hydraulic push rod; the hydraulic rod is a DYTZ type electro-hydraulic push rod; and the drive motor is matched with the hydraulic rod.

In some embodiments, the base support has a circular plate-shaped structure made of aluminum alloy; four grooves for snap fixing of the at least one buckle arc are provided on the surface of the base support in a circular array; the number of the at least one cleaning structure is two; a radius of the base support is smaller than a linear distance between outer edges of the two cleaning structures; the at least one buckle arc is made of plastic, and a surface of the at least one buckle arc is provided with an arc-shaped opening for buckling a tube core structure of the heat exchanger to be cleaned; the at least one buckle arc is at least four buckle arcs, which are distributed in an array; each of the at least four buckle arcs is a replaceable structure; the object sensor is a BT72E type object sensor; an upper surface of the object sensor is level with an upper surface of the base support; the electromagnet is a TAU0837 type electromagnet; the electromagnet and an attraction magnet at a bottom of the hydraulic rod are arranged correspondingly; a polarity of the electromagnet is opposite to a polarity of the hydraulic rod; and the attraction magnet at the bottom of the hydraulic rod is in normal open state.

In some embodiments, the cleaning box is made of barrel-shaped aluminum alloy; the cleaning box is driven to rotate by the motor; an "L"-shaped elbow pipe is arranged at a bottom end of the cleaning box through a circular opening to connect to an outside to achieve water drainage; the rotating plate is sealedly provided inside the cleaning box; the rotating plate is made of circular reinforced plastic; at least two circular threaded through holes are arranged on the surface of the rotating plate; the at least one center column is made of column-shaped plastic; a bottom end of the center column is screwedly fixed on the surface of the rotating plate; the at least one center column is at least two center columns, which are symmetrically distributed; each of the at least one cleaning structure adopts a circular high-elastic sponge, and a plastic column tube is adhered to a center of each of the at least one cleaning structure for buckling the at least one center column; a circular micro-opening is provided on a surface of each of the at least one cleaning structure; the cleaning arc is adhered to the surface of each of the at least one cleaning structure, and the cleaning arc has an "S"-like sponge structure.

In some embodiment, the PLC adopts a Siemens S7-200 PLC; the timer adopts a MS4S motor timer; the distance sensor adopts a micro-epsilon distance sensor; the displacement sensor adopts a TML displacement sensor; the voltage regulator module adopts a 7824 voltage regulator module; the drive module adopts a L298N drive module; and the motor adopts a YE3 type motor.

Compared to the prior art, the present invention has the following beneficial effects.

(1) In the processing device for a high-efficiency heat exchanger for a temperature control system of a fuel cell provided in the present disclosure, an electric structure is set to complete a stable transmission, avoiding serious waste of resources in a manual transmission of the existing structure, which requires a large amount of human resources. Therefore, the processing device optimizes the use of resources and improves the work efficiency.

(2) In the processing device for the high-efficiency heat exchanger for the temperature control system of the fuel cell provided in the present disclosure, a cleaning structure is set to realize a stable contact cleaning, so that the device is cleaned in all directions and all angles in the cleaning state, avoiding the problems that the existing manual cleaning technologies can not guarantee the cleaning effect, and have low efficiency.

In the drawings: 1, frame body; 2, power box; 3, displacement screw; 4, limit switch; 5, hydraulic pump; 6, hydraulic rod; 7, base support; 71, buckle arc; 72, object sensor; 73, electromagnet; 8, base platform; 9, drain pipe; 10, motor; 11, cleaning box; 12, rotating plate; 13, center column; 14, cleaning structure; 141, micro-opening; 142, cleaning arc; 15, casing; 16, side cover; 17, cold inlet; 18, closing plate; 19, spiral flow channel; 20, cold outlet; 21, exchange flow channel; 22, hot inlet; 23, hot outlet; and 24, isolation column.

DETAILED DESCRIPTION OF EMBODIMENTS

The technical solutions in the embodiments of the present disclosure will be clearly and completely described below in conjunction with the accompanying drawings in the embodiments of the present disclosure. Obviously, the described embodiments are only a part of the embodiments of the present disclosure, rather than all the embodiments. Based on the embodiments of the present disclosure, all other embodiments obtained by those of ordinary skill in the art without creative work shall fall within the protection scope of the present disclosure.

In the description of the invention, it should be noted that the orientation or positional relationship indicated by the terms "up", "down", "in", "out", "front end", "rear end", "both ends", "one end" and "other end" is based on the orientation or positional relationship shown in the drawings, which is only for the convenience of describing the present disclosure and simplifying the description, rather than indicating or implying that the device or element must have a specific orientation or a specific orientation, thus, the orientation or positional relationship cannot be understood as a limitation of the present disclosure. In addition, the terms "first" and "second" are only adopted for descriptive purposes, which cannot be understood as indicating or implying relative importance. In the description of the present disclosure, it should be noted that, unless otherwise clearly specified and limited, the terms such as "arrange, "provided with" and "connect" should be understood in a broad sense. For example, the term "connect" may indicate a fixed connection, a detachable connection or an integral connection; it may indicate a mechanical connection or an electrical connection; it may indicate a direct connection or an indirect connection through an intermediate medium; and it may indicate an internal communication between two components. For those of ordinary skill in the art, the specific meanings of the above-mentioned terms in the present disclosure can be understood in specific situations.

Figure 6:
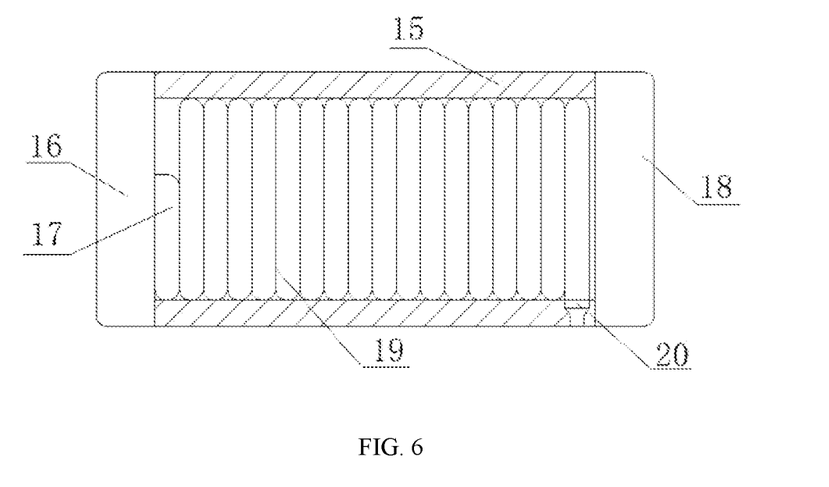
FIG. 6 is a schematic diagram of the high-efficiency heat exchanger for the temperature control system of the fuel cell according to an embodiment of the present disclosure.
Figure 7:
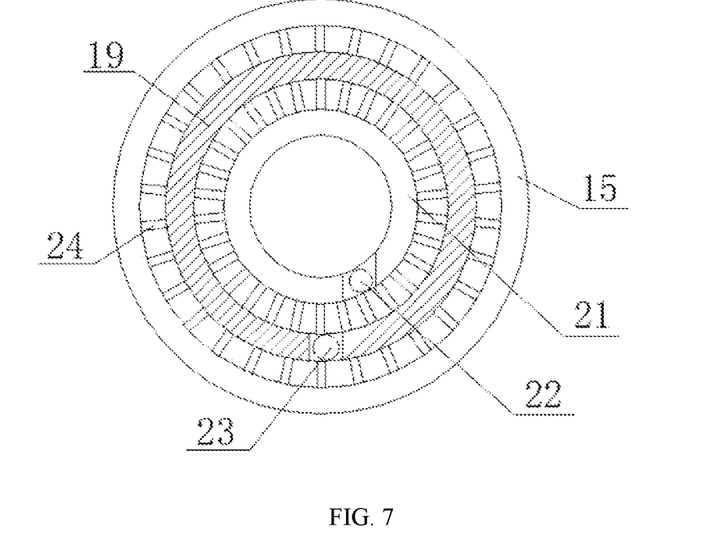
FIG. 7 is a schematic diagram of an appearance structure of an isolation column according to an embodiment of the present disclosure.
Figure 8:
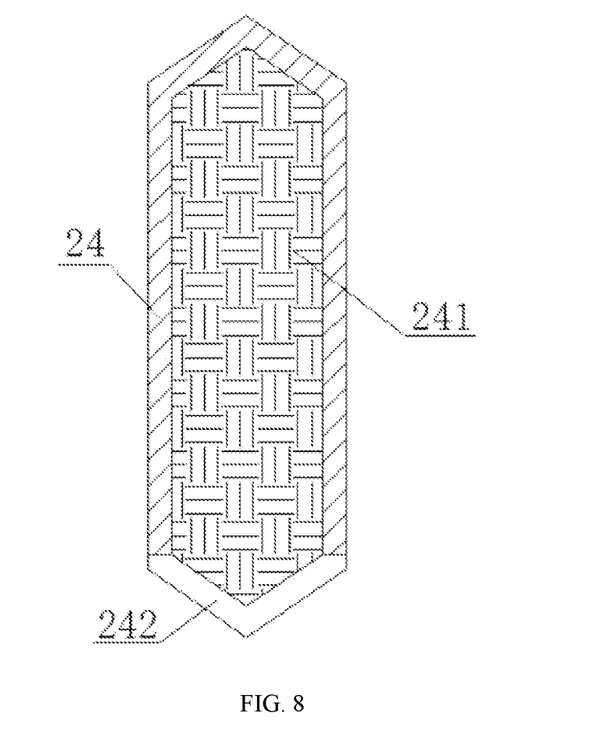
FIG. 8 is a schematic diagram of an internal structure of the isolation column according to an embodiment of the present disclosure.

The embodiment provides a high-efficiency heat exchanger for a temperature control system of a fuel cell, including a casing 15 and a spiral flow channel 19. spiral The flow channel 19 is arranged inside the casing 15. An exchange flow channel 21 is spirally formed at an inner side of the spiral flow channel 19 through an isolation column 24. A cold inlet 17 and a cold outlet 20 are respectively provided at both sides of the spiral flow channel 19. A hot inlet 22 and a hot outlet 23 are respectively provided at both ends of the exchange flow channel 21. The cold inlet 17 and the hot outlet 23 are arranged at a surface of a side cover 16. The side cover 16 is welded to one end of the casing 15. The cold outlet 20 and the hot inlet 22 are respectively inserted into a bottom surface of the casing 15. A closing plate 18 is welded to the other end of the casing 15. An inside of an isolation column 24 is filled with a heat exchange structure 242, and a cover 241 is welded on a surface of one end of the isolation column 24 provided with the heat exchange structure 242.

The isolation column 24 is made of aluminum alloy, and the isolation column 24 has a column-shaped middle and gentle tapers at both ends. The isolation column 24 is uniformly welded on a surface of the spiral flow channel 19 and a surface of exchange flow channel 21, respectively. The isolation column 24 is configured to isolate the spiral flow channel 19 and the exchange flow channel 21 to realize heat transfer and heat exchange. The heat exchange structure 242 is made of graphene. The heat exchange structure 242 is completely filled in a cavity of the isolation column 24, and an outer wall of the heat exchange structure 242 and the isolation column 24 are integrally attached.

The embodiment further provides a processing device for a high-efficiency heat exchanger of a temperature control system of a fuel cell, including a frame body 1, a bottom of which is fixed to ground by screws, and a power box 2, which is arranged at a side of the frame body 1 for intelligent control. A displacement screw 3 is arranged on a top of the frame body 1. A sliding block driven by electricity is arranged on a surface of the displacement screw 3. Two ends of the displacement screw 3 are respectively provided with a limit switch 4 for controlling a limit position of the sliding block. A drive motor 5 is arranged on a surface of the sliding block. A displacement sensor is arranged on a surface of one side of the sliding block. A hydraulic rod 6 is arranged inside the drive motor 5 and driven by the drive motor 5. A base support 7 is adsorbed at a bottom end of the hydraulic rod 6. A cleaning box 11 is arranged under the base support 7. A base platform 8 is arranged at a bottom end of the cleaning box 11. A motor 10 is arranged inside the base platform 8. A shaft end of the motor 10 is penetratingly arranged at a bottom end of the cleaning box 11. An outer periphery of a rotating shaft of the motor 10 is sealed by a sealing ring. A top of the rotating shaft is penetratingly arranged at a bottom end of a rotating plate 12. At least one center column 13 is arranged on a surface of the rotating plate 12. A periphery of each of the at least one center column 13 is sleeved with a cleaning structure 14. A programmable logic controller (PLC) is arranged inside the power box 2. A button switch is arranged on a surface of the power box 2 for controlling on-off of a circuit. A buckle arc 71 is provided on a surface of the base support 7 by a snap fixing. An object sensor 72 is embedded at the surface of the base support on one side of the buckle arc 71. An electromagnet 73 is arranged on the surface of the base support 7. A distance sensor is arranged on a bottom of the base support 7. A plurality of micro-openings 141 are distributed on a surface of the cleaning structure 14, and a cleaning arc 142 is adhered to the surface of the cleaning structure 14.

Figure 1:
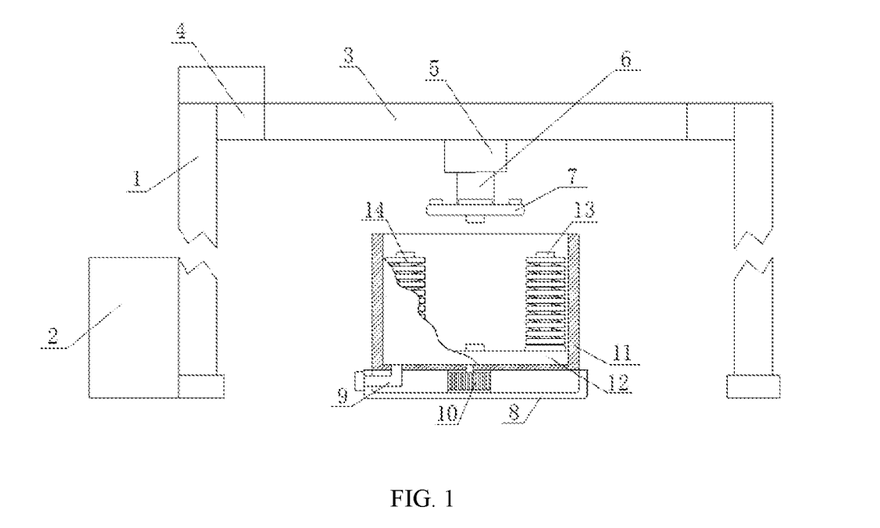
FIG. 1 is a schematic diagram of a processing device for a high-efficiency heat exchanger for a temperature control system of a fuel cell according to an embodiment of the present disclosure.
Figure 2:
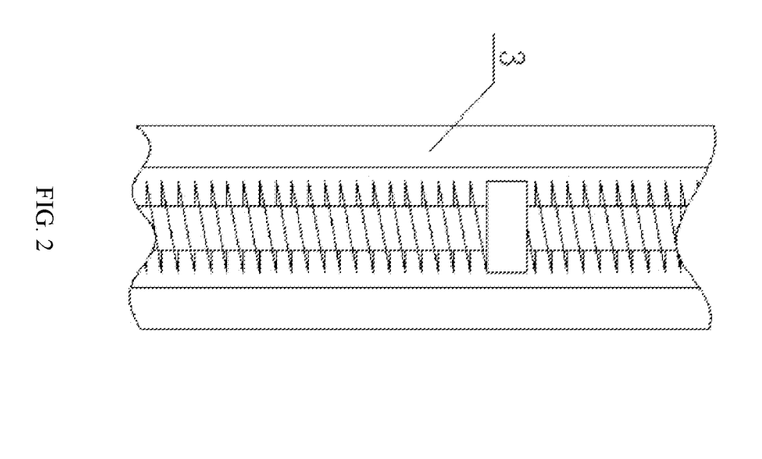
FIG. 2 is a schematic diagram of a displacement screw according to an embodiment of the present disclosure.

The frame body 1 has a rectangular structure made of aluminum alloy, and a connecting line between a center of the frame body 1 and a center of the cleaning box 11 is perpendicular to ground. A linear distance of the frame body 1 is equal to a length of the displacement screw 3. An input terminal of each of the at least one PLC is connected to a switch, the limit switch 4, the distance sensor, an object sensor, a timer, and the displacement sensor through wires. A power port of each of the at least one PLC is connected to an external control power supply through a voltage regulator module. An output terminal of the PLC is connected to the drive motor 5, the electromagnet 73, the displacement screw 3 and the motor 10 through a first drive module, a second drive module, a third drive module and a fourth drive module respectively.

A surface of the displacement screw 3 is divided into three working points by the limit switch 4 and the displacement sensor mounted on a surface of a slider. The hydraulic rod 6 is driven by the PLC to perform actions to realize intelligent transmission at positions corresponding to the three working points. A distance between the displacement screw 3 and the ground is equal to a linear length of the hydraulic rod 6 in a fully-extended state. The limit switch 4 is an mx135 type micro switch. The limit switch 4 is intelligently controlled by the PLC, and a working mode of the limit switch 4 is light touch determination. The drive motor drives the hydraulic rod 6 to form an electric hydraulic push rod. The hydraulic rod is a DYTZ type electro-hydraulic push rod, and the drive motor 5 is matched with the hydraulic rod 6.

Figure 3:
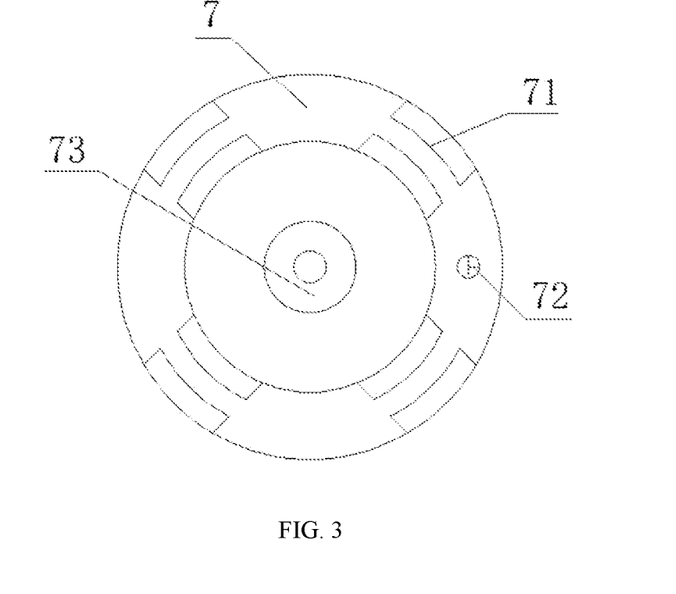
FIG. 3 is a schematic diagram of a base support according to an embodiment of the present disclosure.

The base support 7 has a circular plate-shaped structure made of aluminum alloy. Four grooves for snap fixing of the buckle arc 71 are provided on the surface of the base support 7 in a circular array. A radius of the base support 7 is smaller than a linear distance between outer edges of the two cleaning structures 14. The buckle arc 71 is made of plastic, and a surface of the buckle arc 71 is provided with an arc-shaped opening for buckling a tube core structure of the heat exchanger to be cleaned. The at least one buckle arc is at least four buckle arcs 71, which are distributed in an array, and each of the at least four buckle arcs 71 is a replaceable structure. The object sensor 72 is a BT72E type object sensor. An upper surface of the object sensor 72 is level with an upper surface of the base support 7. The electromagnet 73 is a TAU0837 type electromagnet, and the electromagnet 73 and an attraction magnet at a bottom of the hydraulic rod 6 are arranged correspondingly. A polarity of the electromagnet 73 is opposite to a polarity of the hydraulic rod 6, and the attraction magnet at the bottom of the hydraulic rod 6 is in normal open state.

Figure 4:
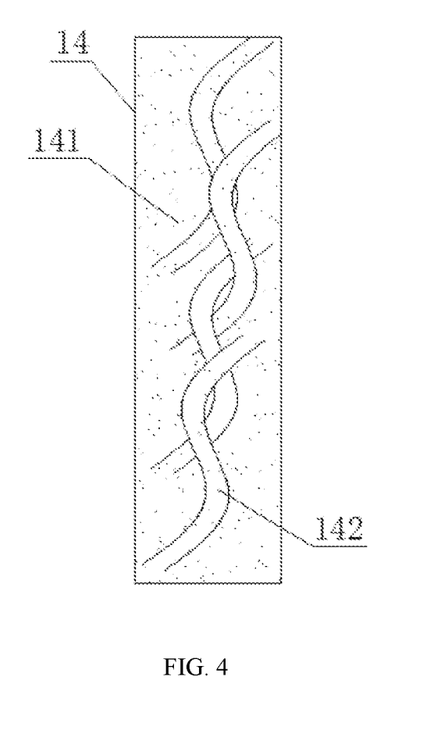
FIG. 4 is a schematic diagram of a cleaning structure according to an embodiment of the present disclosure.
Figure 5:
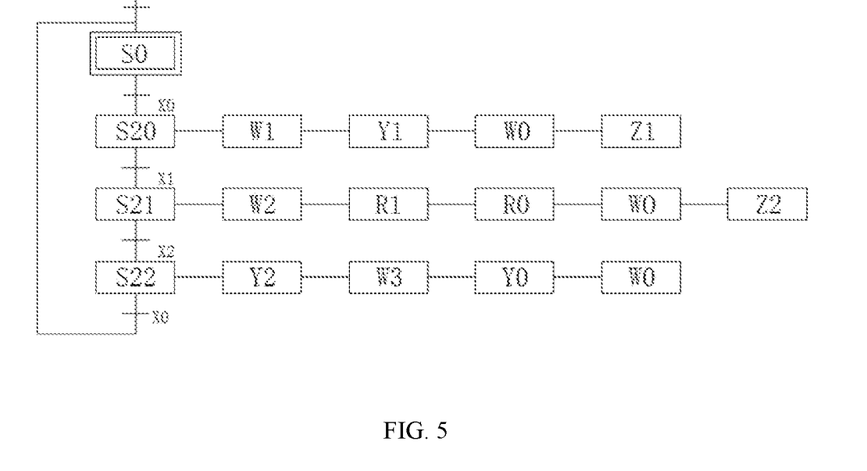
FIG. 5 is a ladder diagram of a PLC in a triggered state according to an embodiment of the present disclosure.

The cleaning box 11 is made of barrel-shaped aluminum alloy, and the cleaning box 11 is driven to rotate by the motor 10. An "L"-shaped elbow pipe is arranged at a bottom end of the cleaning box 10 through a circular opening to connect to an outside to achieve water drainage. The rotating plate 12 is sealedly provided inside the cleaning box 11, and the rotating plate 12 is made of circular reinforced plastic. At least two circular threaded through holes are arranged on the surface of the rotating plate 12. The at least one center column 13 is made of column-shaped plastic. A bottom end of the at least one center column 13 is screwedly fixed on the surface of the rotating plate 12. The at least one center column is at least two center columns, which are symmetrically distributed. The cleaning structure 14 adopts a circular high-elastic sponge, and a plastic column tube is adhered to a center of each of the at least one cleaning structure 14 for buckling the at least one center column 13. A circular micro-opening 141 is provided on a surface of each of the cleaning structure. The cleaning arc 142 is adhered to the surface of each of the at least one cleaning structure 14, and the cleaning arc 142 has an "S"-like sponge structure.

The PLC adopts a Siemens S7-200 PLC. The timer adopts a MS4S motor timer. The distance sensor adopts a micro-epsilon distance sensor. The displacement sensor adopts a TML displacement sensor. The voltage regulator module adopts a 7824 voltage regulator module. The drive module adopts a L298N drive module, and the motor 10 adopts a YE3 type motor.

The various components adopted in this application document are all standard parts. The specific connection methods of each part adopt mature conventional methods such as bolts and welding in the prior art, and the machinery, parts and electrical equipment adopt the conventional models in the prior art. The circuit connection adopts the conventional connection method in the prior art, which will not be repeated herein.

The high-efficiency heat exchanger for the temperature control system of the fuel cell involved in the present disclosure is professionally manufactured by those skilled in the application field. Two parallel steel plates are adopted as raw materials, and the support pillars are uniformly welded on the surfaces of the two parallel steel plates, so that the workers in the field performs processing to form a spiral structure heat exchanger. Compared to the existing heaters, the heat exchanger in the present disclosure adopts the graphene to improve the heat exchange efficiency of the support column, thereby increasing the heat energy transmission speed of the device, and increasing the overall working efficiency of the heat exchanger in turn.

A working principle of the processing device provided in the present disclosure is described as follows.

(1) Intelligent set is performed through PLC programming. Specifically, three conditional trigger points are set on the surface of the displacement screw 3, and a starting position of the sliding block is set at a position where the limit switch 4 on the side of the frame body of the power box 2 is located. At this time, a corresponding position of the sliding block is S0. A starting position of the hydraulic rod 6 is in a curled state, and is remarked as W0 position. After the power is turned on, the S0 position triggers the condition X0, and the S0 position is switched to the S20 position under the X0 condition. Specifically, the hydraulic rod 6 is linearly extended, and the sliding block remains stationary at the S20 position. The hydraulic rod 6 is extended to reach the electromagnet on the surface of the base support 7 to complete the action W1. The object sensor 72 on the surface of the base support 7 senses the existence of an object, and sends a feedback signal to the PLC. The PLC controls the electromagnet 73 to energize, and the base support 7 is attracted to the surface of the hydraulic rod 6 to complete the action Y1. After that, the hydraulic rod 6 returns from the W1 position to the W0 position, and the sliding block performs the action Z1, that is, the sliding block is moved from position S20 to position S21. When the sliding block of the displacement sensor is at position S20, the condition X1 is triggered. Specifically, a center of the sliding block of the displacement sensor is in a straight line with the center of the cleaning box 11. The control hydraulic rod 6 is extended, and the distance sensor senses the linear distance (i.e., a surface of the distance sensor is concave on the bottom surface of the base support 7) between a bottom end of the base support 7 and the rotating plate 12. When the distance reaches a limit value, the hydraulic rod 6 is controlled to stop, and the action W2 is completed. When the proximity sensor is triggered to send a signal feedback to the PLC, the PLC controls the motor 10 to rotate. At the same time, the timer switches from R1 action to R0 action, that is, the timer starts to count down. When the timer counts down, the motor stops rotating, and the hydraulic rod 6 retracts to the W0 position, and then move from the S21 position to the S22 position, thereby completing the action Z2. At the S22 position, the condition X2 is triggered. Specifically, the sliding block moves to the S22 position, the hydraulic rod 6 performs a full extension to complete the action Y2. At this time, the hydraulic rod 6 is located at the W3 position (the ground), and then the electromagnet 73 is de-energized and returns to the Y0 state from the Y1 state. The hydraulic rod 6 begins to return to the W0 state, and the sliding block returns to the start position, thereby completing the cycle.

(2) The required cleaning agent is transmitted to the cleaning box 11 through an external transmission tube, and the cleaning agent is adjusted or chose according to the actual requirements. The device is connected to the external control power supply, and the switch is pressed, so that the device starts to work when the power supply is turned on.

(3) The spiral heat exchanger to be cleaned is placed upright on the surface of the base support 7. At this time, the hydraulic rod 6 extends downwards, and passes through a circular cavity inside the base support 7 to be attracted by the electromagnet 73, so that the hydraulic rod 6 drives the base support and conveys the heat exchanger to be cleaned to the top of the cleaning box 11.

(4) After being transferred to the cleaning tank 11, the hydraulic rod 6 starts to extend. The distance sensor senses the position to control the extension state of the hydraulic rod 6. After the hydraulic rod 6 stops to extend, the motor 10 starts to drive the rotating plate 12 to rotate, driving the water inside the cleaning tank 11 to rotate. A part of the water is adsorbed by the cleaning structure 14. During the rotation, the heat exchanger is stationary. The micro-openings 141 on the surface of the cleaning structure 14 brings the cleaning agent to the contact surface when it contacts the surface of the heat exchanger, and then the cleaning arc 142 increases the contact area of the heat exchanger to achieve a high-efficiency external cleaning. The timer can be adjusted according to actual requirements. After the timer expires, the motor stops working, and the hydraulic rod 6 retracts and continues to transmit.

(5) When the hydraulic rod 6 reaches the limit position, the hydraulic rod 6 is fully extended. After the extension is completed, the electromagnet 73 is powered off, the hydraulic rod 6 and the sliding block are reset, and the cleaned tube cores of the heat exchanger are manually transported to complete the next process operation.

In a conclusion, the processing device of the high-efficiency heat exchanger for the temperature control system of the fuel cell is equipped with a cleaning structure 14, a cleaning box 11, a displacement screw 3 and a center column 13. The cleaning agent is adsorbed through a structure. Multi-directional and multi-angle contact processing are realized by shaking, avoiding the disadvantages that the manual cleaning cannot guarantee the cleaning effect. The displacement screw 3 performs a fixed-point action trigger to achieve a stable transmission effect, avoiding serious waste of resources in a manual transmission of the existing structure, which requires a large amount of human resources.

Although the embodiments of the present disclosure have been shown and described, it should be noted that various changes, modifications and replacements can be made by those of ordinary skill in the art to these embodiments without departing from the principle and spirit of the present disclosure. These changes, modifications and replacements should still fall within the scope of the present disclosure defined by the appended claims.

What is claimed is:

1. A heat exchanger for a temperature control system of a fuel cell, comprising:
a casing; and
a spiral flow channel;
wherein the spiral flow channel is arranged inside the casing; an exchange flow channel is spirally formed at an inner side of the spiral flow channel, an isolation column is uniformly welded between the spiral flow channel and the exchange flow channel; a cold inlet and a cold outlet are respectively provided at both ends of the spiral flow channel; a hot inlet and a hot outlet are respectively provided at both ends of the exchange flow channel; the cold inlet and the hot outlet are arranged at a surface of a side cover and penetrate the side cover, respectively; the side cover is welded to one end of the casing; the cold outlet and the hot inlet are respectively inserted into a bottom surface of the casing; a closing plate is welded to the other end of the casing; an inside of the isolation column is filled with a heat exchange structure; and a cover is welded on a surface of one end of the isolation column provided with the heat exchange structure.

2. The heat exchanger of claim 1, wherein the isolation column is made of aluminum alloy, and the isolation column has a middle part and tapers at both ends of the middle part; the isolation column is uniformly welded on a surface of the spiral flow channel and a surface of exchange flow channel, respectively; the isolation column is configured to isolate the spiral flow channel and the exchange flow channel to realize heat transfer and heat exchange; the heat exchange structure is made of graphene; the heat exchange structure is completely filled in a cavity of the isolation column; and an outer wall of the heat exchange structure and the isolation column are integrally attached.

3. A processing device for a heat exchanger for a temperature control system of a fuel cell, comprising:
a frame body, a bottom of which is fixed to ground by screws; and
a power box, arranged at a side of the frame body;
wherein a displacement screw is arranged on a top of the frame body; a sliding block driven by electricity is arranged on a surface of the displacement screw; two ends of the displacement screw are respectively provided with a limit switch for controlling a limit position of the sliding block; a drive motor is arranged on a surface of the sliding block; a displacement sensor is arranged on a surface of one side of the sliding block; a hydraulic rod is arranged inside the drive motor and driven by the drive motor; a base support is adsorbed at a bottom end of the hydraulic rod; a cleaning box is arranged under the base support; a base platform is arranged at a bottom end of the cleaning box; a drain pipe is arranged inside the base platform; a motor is arranged inside the base platform; a shaft end of the motor is penetratingly arranged at a bottom end of the cleaning box; an outer periphery of a rotating shaft of the motor is sealed by a sealing ring; a top of the rotating shaft is penetratingly arranged at a bottom end of a rotating plate; at least one center column is arranged on a surface of the rotating shaft; a periphery of each of the at least one center column is sleeved with a cleaning structure; a programmable logic controller (PLC) is arranged inside the power box; a button switch is arranged on a surface of the power box for controlling on-off of a circuit; at least one buckle arc is provided on a surface of the base support by snap fixing; an object sensor is embedded at the surface of the base support on one side of the at least one buckle arc; an electromagnet is arranged on the surface of the base support; a distance sensor is arranged on a bottom of the base support; a plurality of micro-openings are distributed on a surface of the cleaning structure; and a cleaning arc is adhered to the surface of the cleaning structure.

4. The processing device of claim 3, wherein the frame body has a rectangular structure made of aluminum alloy; a connecting line between a center of the frame body and a center of the cleaning box is perpendicular to ground; a linear distance of the frame body is equal to a length of the displacement screw; an input terminal of each of the at least one PLC is connected to a switch, the limit switch, the distance sensor, an object sensor, a timer, and the displacement sensor through wires; a power port of each of the at least one PLC is connected to an external control power supply through a voltage regulator module; and an output terminal of the PLC is connected to the drive motor, the electromagnet, the displacement screw and the motor through a first drive module, a second drive module, a third drive module and a fourth drive module, respectively.

5. The processing device of claim 3, wherein a surface of the displacement screw is divided into three working points by the limit switch and the displacement sensor mounted on a surface of the sliding block; the hydraulic rod is driven by the PLC to perform corresponding actions to realize transmission at positions corresponding to the three working points; a distance between the displacement screw and the ground is equal to a linear length of the hydraulic rod in a fully-extended state; the limit switch is a micro switch; the limit switch is intelligently controlled by the PLC; a working mode of the limit switch is light touch determination; the drive motor drives the hydraulic rod to form an electric hydraulic push rod; the hydraulic rod is an electro-hydraulic push rod; and the drive motor is matched with the hydraulic rod.

6. The processing device of claim 3, wherein the base support is a circular plate made of aluminum alloy; four grooves for snap fixing of the at least one buckle arc are provided on the surface of the base support in a circular array; the number of the at least one cleaning structure is two; a radius of the base support is smaller than a linear distance between outer edges of the two cleaning structures; the at least one buckle arc is made of plastic, and a surface of the at least one buckle arc is provided with an arc-shaped opening for buckling a tube core structure of the heat exchanger to be cleaned; the at least one buckle arc is at least four buckle arcs, which are distributed in an array; each of the at least four buckle arcs is a replaceable structure; an upper surface of the object sensor is level with an upper surface of the base support; the electromagnet and an attraction magnet at a bottom of the hydraulic rod are arranged correspondingly; a polarity of the electromagnet is opposite to a polarity of the hydraulic rod; and the attraction magnet at the bottom of the hydraulic rod is in normal open state.

7. The processing device of claim 3, wherein the cleaning box is made of barrel-shaped aluminum alloy; the cleaning box is driven to rotate by the motor; an elbow pipe is arranged at a bottom end of the cleaning box through a circular opening to connect to an outside to achieve water drainage; the rotating plate is sealedly provided inside the cleaning box; the rotating plate is made of circular reinforced plastic; at least two circular threaded through holes are arranged on the surface of the rotating plate; the at least one center column is made of column-shaped plastic; a bottom end of the center column is screwedly fixed on the surface of the rotating plate; the at least one center column is at least two center columns, which are symmetrically distributed; each of the at least one cleaning structure adopts a circular high-elastic sponge, and a plastic column tube is adhered to a center of each of the at least one cleaning structure for buckling the at least one center column; a circular micro-opening is provided on a surface of each of the at least one cleaning structure; the cleaning arc is adhered to the surface of each of the at least one cleaning structure.

* * * * *